United States Patent [19]

Arai et al.

[11] Patent Number: 4,854,145
[45] Date of Patent: Aug. 8, 1989

[54] LOCK DEVICE FOR EQUIPMENT LOADED TO VEHICLE

[75] Inventors: Hisao Arai, Kawagoe; Keisuke Sonehara, Tokyo; Satoshi Yasumura, Tokyo; Junji Kobayashi, Tokyo, all of Japan

[73] Assignee: Kabushiki Kaisha Kenwood, Tokyo, Japan

[21] Appl. No.: 159,279

[22] Filed: Feb. 23, 1988

[30] Foreign Application Priority Data

Feb. 23, 1987 [JP] Japan .............................. 62-24231[U]

[51] Int. Cl.$^4$ ............................................ E05B 65/12
[52] U.S. Cl. ............................................ 70/258; 70/58
[58] Field of Search ...................... 70/258, 57, 58, 63, 70/282; 292/144, 201; 361/171, 172; 340/825.3, 825.31, 825.32

[56] References Cited

U.S. PATENT DOCUMENTS

| | | | |
|---|---|---|---|
| 1,417,430 | 5/1922 | Tulloch | 292/201 |
| 3,848,907 | 11/1974 | Shiurlia | 292/201 |
| 3,947,954 | 4/1976 | Weiler | 70/258 |
| 4,030,322 | 6/1977 | Pettit | 292/144 |
| 4,683,462 | 7/1987 | Takeda | 340/825.32 |
| 4,747,280 | 5/1988 | Shaw | 70/58 |

FOREIGN PATENT DOCUMENTS 2105399 3/1983 United Kingdom ................. 70/258

Primary Examiner—Robert L. Wolfe
Attorney, Agent, or Firm—Gerald J. Ferguson, Jr.

[57] ABSTRACT

A lock device for locking an on-vehicle apparatus in a case built in a vehicle frame comprises an electrical actuator for releasing a locked state upon application of electric power thereto, and a unit for regulating an electric power application time period to drive the electrical actuator for a predetermined time period after an engine switch is turned off.

4 Claims, 3 Drawing Sheets

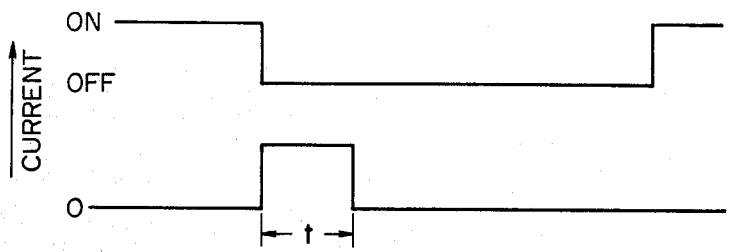
FIG. 5A
FIG. 5B
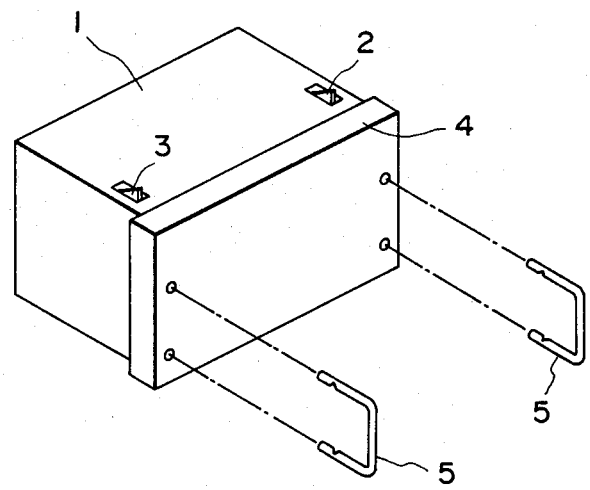
FIG. 6
PRIOR ART

LOCK DEVICE FOR EQUIPMENT LOADED TO VEHICLE

BACKGROUND OF THE INVENTION

1. Field of the Invention

The present invention relates to a lock device for an on-vehicle apparatus such as a stereo sound system, transceiver and the like by which the apparatus is locked in a case built in the frame of a vehicle such as an automobile, and more particularly to a lock device used for preventing the on-vehicle apparatus from being stolen and for allowing the apparatus to be used outside the vehicle.

2. Related Art

A conventional lock device for locking an onvehicle apparatus in a case fixedly mounted on the vehicle frame is constructed as shown in FIG. 6, wherein an on-vehicle apparatus 4 is locked in a case 1 by projecting a claw 3 into a slot 2 formed in the case 1, thus preventing the apparatus from being stolen. In order to remove the apparatus 4 from the case 1, the claw 3 is pushed down toward the apparatus 4 by inserting, for example, an unlock jig 5 into the case 1.

Such a conventional lock device, however, poses some problems. It is necessary to keep the unlock jig in some place. In addition, if a jig of the same configuration is used, the lock device can be unlocked and the apparatus will be stolen.

SUMMARY OF THE INVENTION

It is therefore an object of the present invention to provide a lock device which does not use an unlock jig and can hold an unlocked state for a certain time period.

To achieve the above object of the present invention, a lock device for locking an on-vehicle apparatus in a case built in a vehicle frame comprises an electrical actuator for unlocking the device upon application of electric power thereto, and means for regulating the electric power application time period to drive the electrical actuator for a predetermined time period after an engine switch is turned off.

With the locking device contructed as above, the electrical actuator is driven only for the predetermined time period after an engine switch is turned off, to thereby release a locked state between the case and the on-vehicle apparatus to unlock the lock device for the predetermined time period.

Consequently, while driving the engine or other car accessaries, the locked state is maintained and the on-vehicle apparatus does not come out of the case even under large acceleration to thus ensure safety. Further, after the predetermined time period after the engine switch is turned off, the on-vehicle apparatus is caused to be locked. Therefore, even if the driver gets out of the vehicle, the on-vehicle apparatus cannot be stolen. Furthermore, since a locked state between the on-vehicle apparatus and the case is released during the predetermined time period, the driver can remove the apparatus from the case and the vehicle without worrying about it being stolen.

BRIEF DESCRIPTION OF THE DRAWINGS

FIGS. 5A and 5B show waveforms illustrating the operation of an electrical actuator driven by the drive circuit; and FIG. 6 is a perspective view used for explaining a conventional lock device.

DETAILED DESCRIPTION OF THE PREFERRED EMBODIMENTS

The invention will now be described referring to a preferred embodiment.

Figure 1:
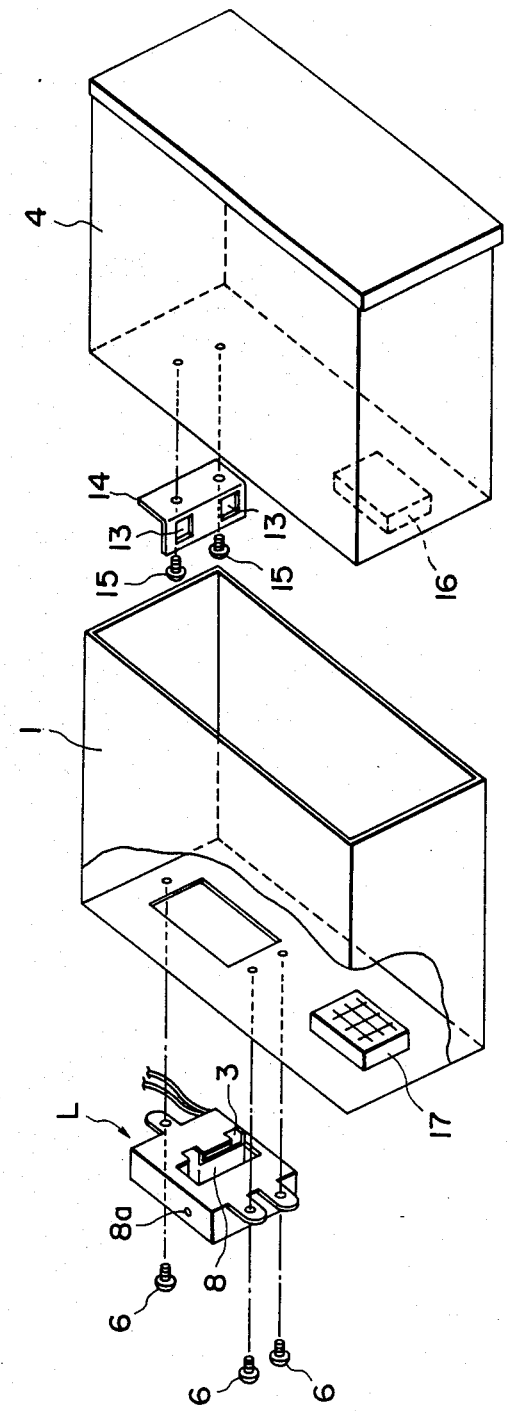
FIG. 1 is a schematic illustration showing an exploded view of an embodiment of a lock device according to the present invention.
Figure 2:
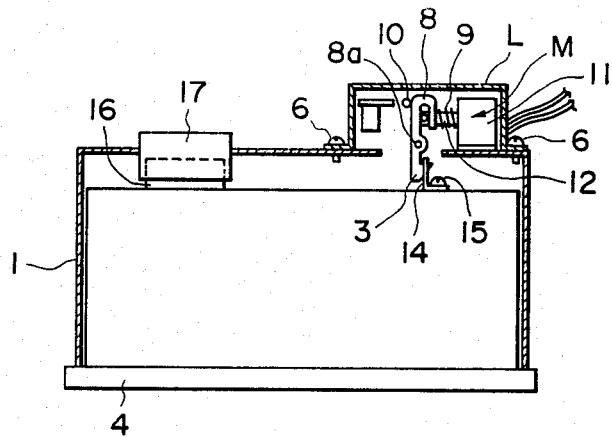
FIG. 2 is a sectional side view of the lock device in the locked state.
Figure 3:
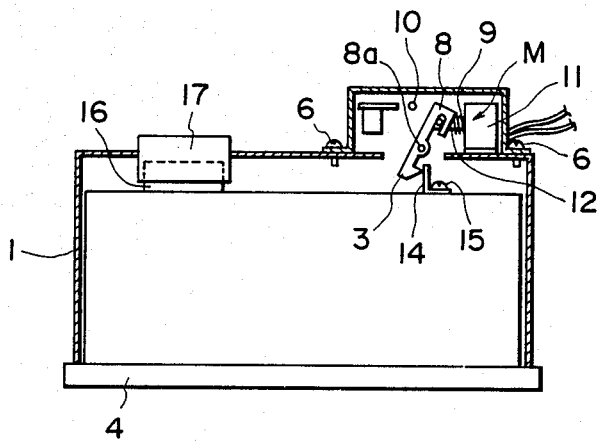
FIG. 3 is a sectional side view of the lock device in the locked state.

FIG. 1 schematically shows the disassembled lock device of the embodiment of this invention, and FIGS. 2 and 3 are sectional side views illustrating the operation of the lock device.

A case 1 for accommodating an on-vehicle apparatus 4 is fixedly mounted on a vehicle frame (not shown). A lock device L for locking the apparatus 4 in the case 1 is fixedly mounted on the case by suitable means such as screws 6. In the lock device L, a lock member 8 with a claw 3 is pivotally mounted on a shaft 8a. One end of the lock member 8 opposite to the claw 3 is urged by one end of a coil spring 9. The lock member 8 is pushed by the coil spring 9 and rotated counter-clockwise as seen in the Figures until it contacts a stopper 10. The tip of a plunger 12 of an electromagnetic actuator M having a solenoid 11 is fixed at the one end of the lock member 8. When the electromagnetic actuator M is energized, the plunger 12 is attracted against the force of the coil spring 9 so that the lock member 8 is rotated clockwise.

An engaging plate 14 is fixedly mounted on the on-vehicle apparatus 4 by suitable means such as screws 15. While the electromagnetic actuator M is not energized, the claw 3 enters an engaging slot 13 and its tip extends into and passes through the slot to engage with it. When apparatus 4 is housed in the case 1, a connector 16 mounted on the apparatus 4 is coupled to a connector 17 mounted on the case 1 to thereby obtain electrical connection therebetween.

Figure 4:
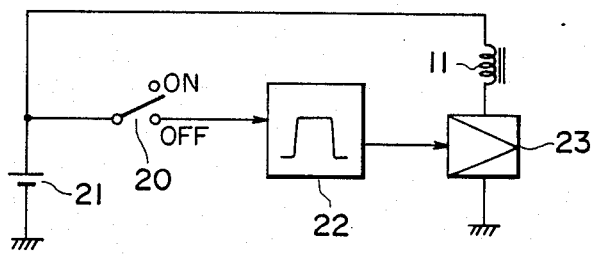
FIG. 4 is a circuit diagram of the drive circuit for the lock device.

Referring to FIG. 4, voltage from a power supply 21 is applied to a time constant circuit 22 via an off-contact of an vehicle engine switch 20. An output from the time constant circuit 22 is supplied to a solenoid driver 23 to energize the solenoid 11 and drive the plunger 12 for a time period determined by the time constant circuit 22 after a movable contact of the engine switch 20 is moved to the off-contact.

The solenoid 11 maintains de-energized at the off-contact of the engine switch 20 except when the engine switch 20 is at an ignition-on state and for the period determined by the time contact circuit 22. Therefore, during the de-energized period of the solenoid 11, as shown in FIG. 2, the lock member 8 takes a position rotated counter-clockwise with respect to FIG. 3 by the force of the coil spring 9, the claw 3 enters the engaging slot 13, and the tip of the claw 3 extends beyond the back of the engaging plate 14. As a result, the on-vehicle apparatus 4 housed in the case 1 is locked.

Referring to FIGS. 5A and 5B, for a predetermined time period t, e.g., ten seconds, determined by the time constant circuit 22 immediately after the engine switch 20 is moved to the off-contact, the solenoid 11 is energized and the plunger 12 is attracted against the force of the coil spring 9 so that the lock member 8 is rotated clockwise and the claw 3 is disengaged from the engaging slot 13 as shown in FIG. 3. Under this condition, the apparatus 4 can be pulled out from the case 1.

In the above embodiment, the engine switch 20 has been described as having an ignition on-state and off-state. However, in the case of an engine switch having a contact for effecting voltage supply to car accessaries such as head lamps, this contact may be used as the on-contact of the engine switch 20 shown in FIG. 4. The drive circuit of the electromagnetic actuator M may be connected electrically using the connectors 16 and 17.

As described so far, the locked state between the case and the on-vehicle apparatus housed in the case is released only during a predetermined time period after the engine switch is truned off. Outside of the predetermined time period, the apparatus cannot be removed from the case or the vehicle frame so that there is no fear that the apparatus will slip out of the case under large accelerations applied to the vehicle or even under an extreme case of rear-end collision by another vehicle.

Further, even if a driver goes out of the vehicle for a short time, the on-vehicle apparatus is locked after the predetermined time period after moving the engine switch to the off-contact, thus preventing the apparatus from being stolen. It is common that the driver is near the vehicle during the predetermined time period. Therefore, there is no fear that the apparatus will be stolen during this time period. Moving the engine switch to the off-contact may be effected either from the ignition on-state or from the accessary contact on-state.

Furthermore, if a driver must go out of the vehicle for a long time, the driver can remove the apparatus from the case during the predetermined time period during which the locked state therebetween is released. Therefore, the driver can leave vehicle with the apparatus in hand, thus preventing the apparatus from being stolen and enabling it to be used outside the vehicle.

Since the lock device of this invention no associated circuits, switches and the like in the on-vehicle apparatus, the lock device can be mounted easily as long as the lock device L can be housed in the case and the engaging plate 14 can be attached to the apparatus.

What is claimed is:

1. A lock device for an on-vehicle apparatus comprising:
   a first locking member mounted on a case which receives the on-vehicle apparatus and is mounted in the vehicle;
   a second locking member mounted on the on-vehicle apparatus, said first and second locking members mechanically engaging each other when said on-vehicle apparatus is received within the case;
   means responsive to the turning off of an ignition switch of the vehicle for generating an unlocking signal having a predetermined time period after the ignition switch has been turned off; and
   electrical actuator means responsive to said unlocking signal for disengaging said first locking member from said second locking member during said predetermined time period.

2. A lock device for an on-vehicle apparatus according to claim 1 wherein said predetermined time period is approximately 10 seconds.

3. A lock device for an on-vehicle apparatus according to claim 1 further comprising biasing means for biasing said first locking member toward said such second locking member to cause said first and second locking members to engage each other before and after said predetermined time period.

4. A lock device for an on-vehicle apparatus according to claim 1 wherein said first locking member comprises a latch and said second locking member comprises a keeper.

* * * * *